US012139074B2

(12) United States Patent
Johansson et al.

(10) Patent No.: US 12,139,074 B2
(45) Date of Patent: Nov. 12, 2024

(54) SYSTEM AND METHOD FOR PROVIDING A DESIRED VIEW FOR A VEHICLE OCCUPANT

(71) Applicant: Ningbo Geely Automobile Research & Development Co., Ltd., Ningbo (CN)

(72) Inventors: Jonathan Johansson, Gothenburg (SE); Erik Lindberg Nilsson, Gothenburg (SE)

(73) Assignee: NINGBO GEELY AUTOMOBILE RESEARCH &DEV. CO., LTD., Ningbo (CN)

( * ) Notice: Subject to any disclaimer, the term of this patent is extended or adjusted under 35 U.S.C. 154(b) by 0 days.

(21) Appl. No.: 17/531,755

(22) Filed: Nov. 21, 2021

(65) Prior Publication Data
US 2022/0080890 A1 Mar. 17, 2022

Related U.S. Application Data

(63) Continuation of application No. PCT/CN2020/092104, filed on May 25, 2020.

(30) Foreign Application Priority Data

May 29, 2019 (EP) ..................................... 19177328

(51) Int. Cl.
*B60R 1/27* (2022.01)
*G06F 3/01* (2006.01)
(Continued)

(52) U.S. Cl.
CPC ................ *B60R 1/27* (2022.01); *G06F 3/012* (2013.01); *G06F 3/013* (2013.01); *G06V 20/597* (2022.01); *H04N 5/268* (2013.01); *H04N 23/698* (2023.01); *H04N 23/90* (2023.01); *B60R 2300/102* (2013.01); *B60R 2300/105* (2013.01); *B60R 2300/303* (2013.01)

(58) Field of Classification Search
CPC ................ B60R 1/00; B60R 2300/102; B60R 2300/105; B60R 2300/303;
(Continued)

(56) References Cited

U.S. PATENT DOCUMENTS

2009/0268025 A1 10/2009 Hiramaki
2018/0048801 A1* 2/2018 Kiser ..................... H04N 23/57
(Continued)

FOREIGN PATENT DOCUMENTS

CN 103063224 A 4/2013
CN 103767715 A 5/2014
(Continued)

OTHER PUBLICATIONS

International Search Report from corresponding International Application No. PCT/CN2020/092104, dated Aug. 28, 2020, 2 pages.

*Primary Examiner* — Farzana Hossain
(74) *Attorney, Agent, or Firm* — Tucker Ellis LLP

(57) ABSTRACT

A system, method and computer program product for providing a desired camera view of interest for a vehicle occupant. The method includes obtaining, by the least a first interior view camera, at least a first interior view of the face and/or the head of the vehicle occupant determining, based on the at least first interior view, at least any of a gaze direction and a head direction of the vehicle occupant for understanding where the vehicle occupant is looking, determining, that the view of interest for the vehicle occupant is, at least partly, within the at least first exterior view of the at least first exterior view camera, and displaying the at least first exterior view to the vehicle occupant via the at least first display.

16 Claims, 5 Drawing Sheets

(51) Int. Cl.
*G06V 20/59* (2022.01)
*H04N 5/268* (2006.01)
*H04N 23/698* (2023.01)
*H04N 23/90* (2023.01)

(58) Field of Classification Search
CPC ..... B60R 2300/70; G06F 3/012; G06F 3/013; G06V 20/597; H04N 5/268; H04N 23/698; H04N 23/90
See application file for complete search history.

(56) References Cited

U.S. PATENT DOCUMENTS

| | | | |
|---|---|---|---|
| 2019/0197327 A1* | 6/2019 | Mangla | B60R 11/04 |
| 2020/0073520 A1* | 3/2020 | Mohan | G06Q 30/0235 |
| 2020/0232807 A1* | 7/2020 | Müller | G06V 20/584 |
| 2020/0254876 A1* | 8/2020 | Cordell | G06V 20/56 |
| 2021/0084227 A1* | 3/2021 | Gehrling | H04N 23/695 |

FOREIGN PATENT DOCUMENTS

| | | | |
|---|---|---|---|
| CN | 104252229 | A | 12/2014 |
| CN | 106915302 | A | 7/2017 |
| EP | 1962509 | A1 | 8/2008 |
| EP | 2743133 | A2 | 6/2014 |
| GB | 2508860 | A1 | 6/2014 |
| JP | 2007015663 | A | 1/2007 |
| JP | 2012084108 | A | 4/2012 |
| WO | 2013053678 | A1 | 4/2013 |
| WO | 2018206213 | A1 | 11/2018 |

\* cited by examiner

SYSTEM AND METHOD FOR PROVIDING A DESIRED VIEW FOR A VEHICLE OCCUPANT

RELATED APPLICATION DATA

This application is a continuation of International Patent Application No. PCT/CN2020/092104, filed May 25, 2020, which claims the benefit of European Patent Application No. 19177328.2, filed May 29, 2019, the disclosures of which are incorporated herein by reference in their entireties.

TECHNICAL FIELD

The disclosure pertains to the field of providing visibility for a vehicle occupant.

BACKGROUND

It is desired for vehicle occupants to have a good visibility of the surroundings of the vehicle. Most vehicles today are equipped with windows that provide with views in a plurality of directions around the vehicle. It is also very common to use mirrors to provide with e.g. a rear view of the vehicle to the vehicle occupant via the mirror. Side mirrors of each side of the vehicle provides with rear views of each side of the vehicle. A rearview mirror, often mounted inside of the vehicle compartment, provides with a rear view of what is behind the vehicle. Modern vehicles are also often equipped with backup cameras to provide with a rear view on a display for a better view of what is behind the vehicle for the vehicle occupant when e.g. backing up the vehicle. Such backup camera is often automatically activated when the reverse gear of the vehicle is selected. The display to the backup camera is often mounted in the vehicle compartment to provide with the view of the backup camera for the vehicle occupant.

SUMMARY

There is a demand for an easier and more convenient, intuitive way to get better visibility of the views around the vehicle for the vehicle occupant. In particular there is a demand for better visibility of the views around the vehicle at all times, and not only in a certain direction when e.g. backing up the vehicle. There are vehicles, e.g. self-driving, autonomous vehicles with cameras in plurality of directions, where the cameras are used for e.g. detecting objects in the surroundings of the vehicle. Such cameras are often used by on-board computers in the vehicle and the information from each camera is processed by a computer to e.g. determine an object in the surroundings of the vehicle. Still, if such cameras are to provide a vehicle occupant with views around the vehicle, the vehicle occupant have to manually select e.g. a camera view of a camera that provides with a desired camera view in a certain direction, to see the camera view in that direction on a display. Another example are parking assist cameras that are configured to provide with views in certain directions when parking the vehicle. The camera view directions of such parking assist cameras are often pre-defined and presented to the vehicle occupant via a display in the vehicle compartment.

The inventors have identified that it is often cumbersome for a vehicle occupant to get a certain camera view displayed on a display when maneuvering the vehicle at the same time. E.g. in order to get a certain view of a parking assist camera that provides with a plurality of views, the vehicle occupant needs to manually input and/or adjust or select a desired camera view to be displayed on the display. This interaction may cause the vehicle occupant to lose attention of the surroundings of the vehicle for a moment, while interacting with the display and camera system, e.g. the parking assist cameras. An object of the present disclosure is to provide vehicle camera control system and method for providing a desired camera view of interest for a vehicle occupant which seek to mitigate, alleviate, or eliminate one or more of the above-identified deficiencies in the art and disadvantages singly or in any combination.

The disclosure proposes a vehicle camera control system for providing a desired camera view of interest for a vehicle occupant. The vehicle camera control system comprises at least a first exterior view camera configured to obtain at least a first exterior view of the surroundings outside of the vehicle, at least a first interior view camera configured to obtain at least a first interior view of the vehicle occupant inside of the vehicle and at least a first display configured to display the at least first exterior view. The vehicle camera control system further comprises a processing circuitry operatively connected to the at least first exterior view camera, the at least first interior camera and the at least first display. The processing circuitry is configured to cause the vehicle camera control system to obtain, by the least a first interior view camera, at least a first interior view of the face and/or the head of the vehicle occupant and determine, based on the at least first interior view, at least any of a gaze direction and a head direction of the vehicle occupant for understanding where the vehicle occupant is looking. The processing circuitry is further configured to cause the vehicle camera control system to determine, based on at least any of the determined gaze direction and the determined head direction, a view of interest for the vehicle occupant and determine, that the view of interest for the vehicle occupant is, at least partly, within the at least first exterior view of the at least first exterior view camera, and display the at least first exterior view to the vehicle occupant via the at least first display. An advantage with the vehicle camera control system is that the view of interest is automatically displayed to the vehicle occupant at the at least first display, using the determined gaze direction and/or the determined head direction, which means that the vehicle occupant can maintain full attention to the surroundings around the vehicle.

According to an aspect it is determined that the view of interest for the vehicle occupant corresponds to the view through at least a first window of the vehicle. This means that when the vehicle occupant has a gaze direction and/or head direction that corresponds to the view through at least a first window, at least a first exterior view that corresponds to a view through at least a first window is provided to the vehicle occupant via the at least first display.

According to an aspect it is determined that the view of interest for the vehicle occupant corresponds to a mirror view of at least a first mirror of the vehicle. In other words, this means that when the vehicle occupant has a gaze direction and/or head direction towards the at least a first mirror, at least a first exterior view that corresponds to the view as normally seen via the at least first mirror is provided to the vehicle occupant via the at least first display.

According to an aspect the view of interest for the vehicle occupant is further determined based on that the vehicle occupant maintains a certain gaze direction or a head direction during at least a predetermined first time period. This means that the vehicle occupant has to show interest in the particular view of interest during a certain time period in order to change the view of the at least first display. This helps the vehicle occupant to see the desired view of interest.

According to an aspect it is determined that the view of interest for the vehicle occupant corresponds to a plurality of views in a plurality of directions around the vehicle, and displaying a plurality of exterior views to the vehicle occupant via the at least first display. An advantage with this aspect is that the vehicle occupant may have plural views of interest and that plural exterior views that corresponds to the plural views of interest is provided to the vehicle occupant via the at least first display.

According to an aspect the plurality of exterior views corresponds to a 360 degree view around the vehicle. This means that plural exterior views that corresponds to a 360 degree view of interest is provided to the vehicle occupant via the at least first display. This helps the vehicle occupant to see the desired views of interest.

According to an aspect the view of interest for the vehicle occupant is further determined based on that the vehicle occupant change the gaze direction or the head direction a plurality of times within a predetermined second time period. In other words, if the vehicle occupant shows an interest in a plurality of different views within a predetermined second time period, the view of interest is determined based in the plurality of different gaze and/or head directions. This helps the vehicle occupant to see the desired views of interest.

The disclosure further proposes a method for providing a desired camera view of interest for a vehicle occupant. The method comprising the step of obtaining, by the least a first interior view camera, at least a first interior view of the face and/or the head of the vehicle occupant, the step of determining, based on the at least first interior view, at least any of a gaze direction and a head direction of the vehicle occupant for understanding where the vehicle occupant is looking. The method further comprising the step of determining, that the view of interest for the vehicle occupant is, at least partly, within the at least first exterior view of the at least first exterior view camera, and the step of displaying the at least first exterior view to the vehicle occupant via the at least first display. An advantage with the vehicle camera control system is that the view of interest is automatically displayed to the vehicle occupant at the at least first display, using the determined gaze direction and/or the determined head direction, which means that the vehicle occupant can maintain full attention to the surroundings around the vehicle.

According to an aspect, it is determined that the view of interest for the vehicle occupant corresponds to the view through at least a first window of the vehicle. This means that when the vehicle occupant has a gaze direction and/or head direction that corresponds to the view through at least a first window, at least a first exterior view that corresponds to a view through at least a first window is provided to the vehicle occupant via the at least first display.

According to an aspect it is determined that the view of interest for the vehicle occupant corresponds to a mirror view of at least a first mirror of the vehicle. In other words, this means that when the vehicle occupant has a gaze direction and/or head direction towards the at least a first mirror, at least a first exterior view that corresponds to the view as normally seen via the at least first mirror is provided to the vehicle occupant via the at least first display.

According to an aspect the view of interest for the vehicle occupant is further determined based on that the vehicle occupant maintains a certain gaze direction or a head direction during at least a predetermined first time period. In other words, this means that when the vehicle occupant has a gaze direction and/or head direction towards the at least a first mirror, at least a first exterior view that corresponds to the view as normally seen via the at least first mirror is provided to the vehicle occupant via the at least first display. This helps the vehicle occupant to see the desired view of interest.

According to an aspect it is determined that the view of interest for the vehicle occupant corresponds to a plurality of views in a plurality of directions around the vehicle, and displaying a plurality of exterior views to the vehicle occupant via the at least first display. An advantage with this aspect is that the vehicle occupant may have plural views of interest and that plural exterior views that corresponds to the plural views of interest is provided to the vehicle occupant via the at least first display.

According to an aspect the plurality of exterior views corresponds to a 360 degree view around the vehicle. This means that plural exterior views that corresponds to a 360 degree view of interest is provided to the vehicle occupant via the at least first display. This helps the vehicle occupant to see the desired views of interest.

According to an aspect the view of interest for the vehicle occupant is further determined based on that the vehicle occupant change the gaze direction or the head direction a plurality of times within a predetermined second time period. In other words, if the vehicle occupant shows an interest in a plurality of different views within a predetermined second time period, the view of interest is determined based in the plurality of different gaze and/or head directions.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
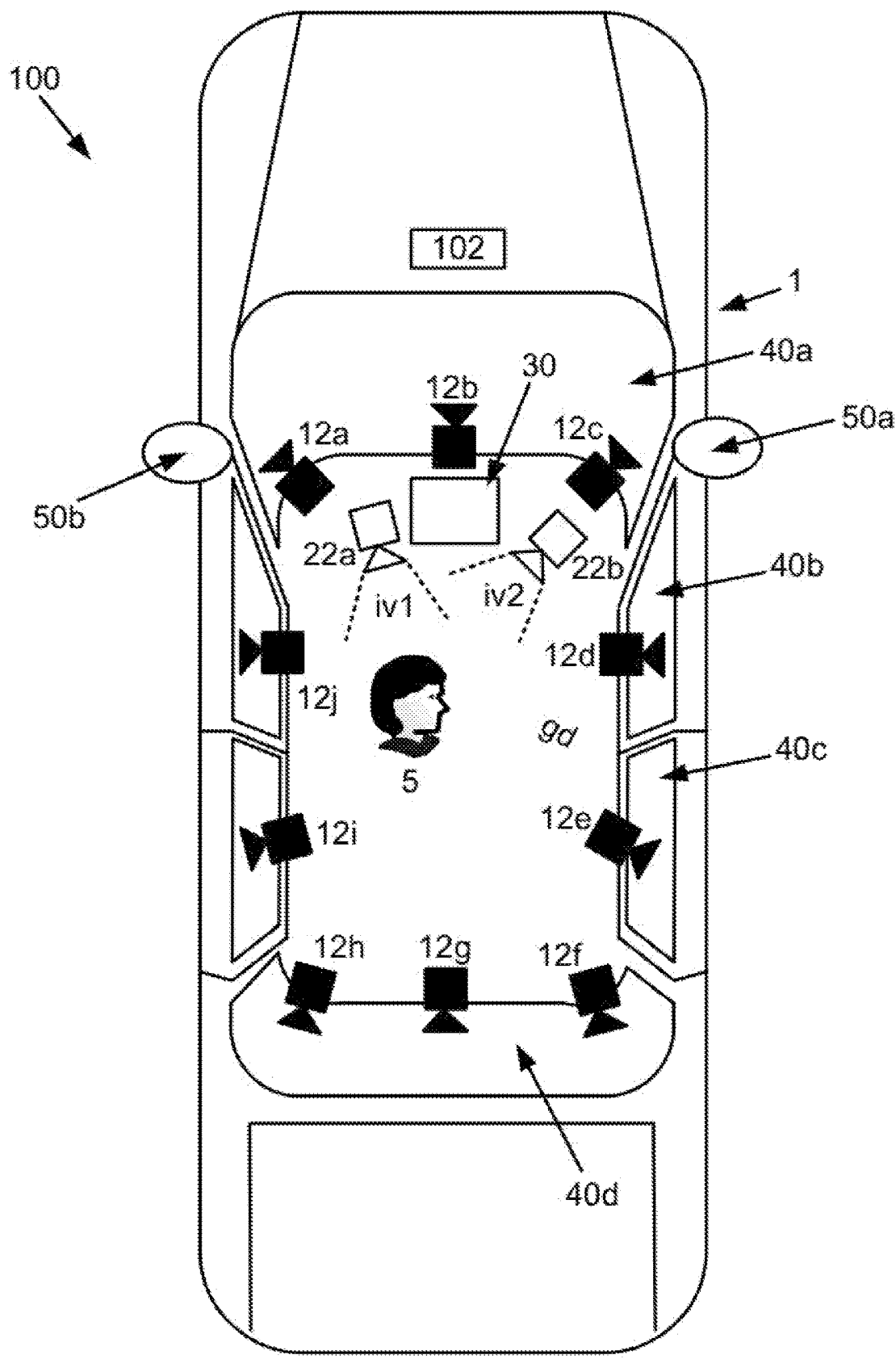
FIG. 1A illustrates an overview of the vehicle camera control system according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

There is a demand for an easier and more convenient, intuitive way to get better visibility of the views around the vehicle for the vehicle occupant. There are vehicles, e.g. self-driving, autonomous vehicles with cameras in plurality of directions, where the cameras are used for e.g. detecting objects in the surroundings of the vehicle. Such cameras are often used by on-board computers in the vehicle and the information from each camera is processed by a computer to e.g. determine an object in the surroundings of the vehicle. Still, the vehicle occupant have to manually select e.g. a camera view of a camera that provides with a desired camera view in a certain direction, to see the camera view in that direction on a display. Another example is parking assist cameras that are configured to provide with views in certain directions when parking the vehicle. The camera view directions of such parking assist cameras are often predefined and presented to the vehicle occupant via a display in the vehicle compartment.

The inventors have identified that it is often cumbersome for a vehicle occupant to get a certain camera view displayed on a display when maneuvering the vehicle at the same time. E.g. in order to get a certain view of parking assist cameras, the vehicle occupant needs to manually input and/or adjust or select a desired camera view to be displayed on the display. This interaction may cause the vehicle occupant to lose attention of the surroundings of the vehicle for a moment, while interacting with the display and camera system, e.g. the parking assist cameras. An object of the present disclosure is to provide vehicle camera control system and method for providing a desired camera view of interest for a vehicle occupant which seek to mitigate, alleviate, or eliminate one or more of the above-identified deficiencies in the art and disadvantages singly or in any combination.

The disclosure proposes a vehicle camera control system 100 for providing a desired camera view of interest for a vehicle occupant 5.

Figure 1B:
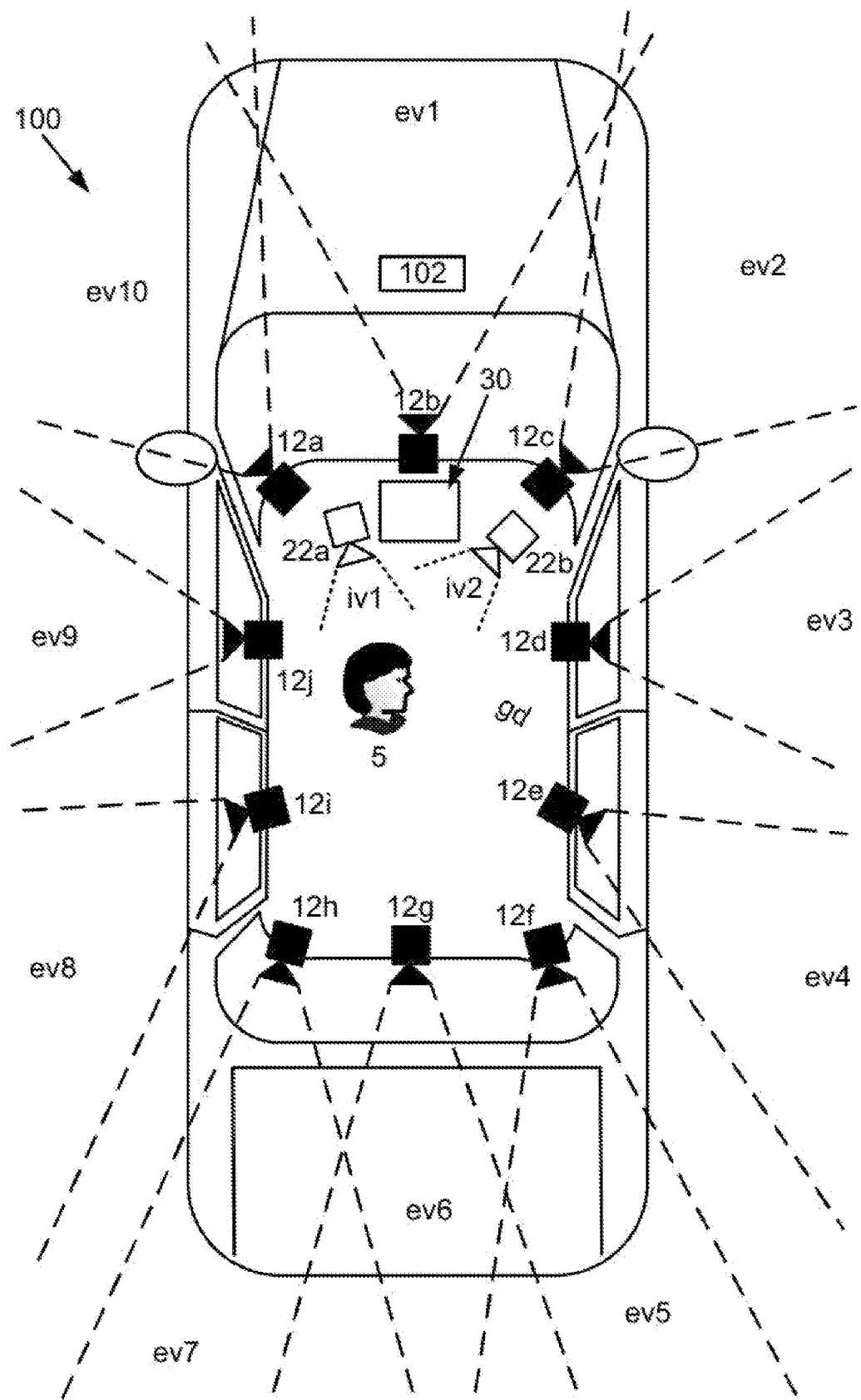
FIG. 1B illustrates exterior views of exterior view cameras of the vehicle camera control system according to an aspect of the disclosure.

As illustrated in FIGS. 1A and 1B, the vehicle camera control system 100 comprises at least a first exterior view camera 12a-12j configured to obtain at least a first exterior view ev1-ev10 of the surroundings outside of the vehicle 1. In an example the at least first exterior view camera 12a-12j is mounted on the outside or on the inside of the vehicle. According to an aspect the at least first exterior view camera 12a-12j is integrated into the body of the vehicle. The at least first exterior view camera 12a-12j obtains at least a first exterior view ev1-ev10 of the surroundings outside of the vehicle 1. According to an aspect the at least first exterior view ev1-ev10 is a wide angle view of the surroundings outside of the vehicle 1 provided by a wide angle lens of the at least first exterior view camera 12a-12j. According to an aspect the at least first exterior view ev1-ev10 is a telephoto view of the surroundings outside of the vehicle 1 provided by a telephoto lens of the at least first exterior view camera 12a-12j. According to an aspect the vehicle camera control system 100 comprises a combination of different exterior view cameras 12a-12j for providing both a wide angle view and a telephoto view of the surroundings outside of the vehicle 1. According to an aspect, as illustrated in FIG. 1B, a first exterior view camera 12h and a second exterior view camera 12g are configured to obtain at least a first exterior view ev7 and a second exterior view ev6 that are overlapping.

The vehicle camera control system 100 further comprises at least a first interior view camera 22a, 22b configured to obtain at least a first interior view iv1, iv2 of the vehicle occupant 5 inside of the vehicle 1. In the example as illustrated in FIG. 1A, a first interior view camera 22a and a second interior view camera 22b are mounted in front of the vehicle occupant 5 in order to obtain a first interior view iv1 and a second interior view iv2 of the vehicle occupant 5. In an example at least a first interior view camera 22a and at least a second interior view camera 22b are mounted to provide at least a first interior view iv1 and at least a second interior view iv2 of the vehicle occupant 5 from different of angles around the vehicle occupant. According to an aspect the at least first interior view camera 22a, 22b is configured to perform image processing of the captured images of the vehicle occupant 5. According to an aspect the at least first interior view camera 22a, 22b is configured to detect at least one of the face and the eyes of the vehicle occupant 5.

The vehicle camera control system 100 further comprises at least a first display 30 configured to display the at least first exterior view ev1-ev10 provided by the at least first exterior view camera 12a-12j. According to an aspect the at least first display 30 is a part of the vehicle entertainment system. According to an aspect the at least first display 30 is integrated in the dashboard of the vehicle. According to an aspect the at least first display 30 is a head-up display that is visible at or on at least a first window 40a, 40b, 40c, 40d of the vehicle. According to an aspect the at least first display 30 is a separate display unit that can be placed at a desired location in the vehicle 1 by the vehicle occupant 5.

The vehicle camera control system 100 further comprises a processing circuitry 102. According to an aspect the processing circuitry 102 is the processing circuitry of an on-board vehicle computer. According to an aspect the processing circuitry 102 is a processing circuitry comprised in an electronic device connected to the vehicle camera control system 100 via a wireless communication network. According to an aspect the processing circuitry 102 is operatively connected to a memory for storing and managing data. According to an aspect the memory is the memory of an on-board vehicle computer. According to an aspect the memory is comprised in an electronic device connected to the vehicle camera control system 100 via a wireless communication network.

The processing circuitry 102 is operatively connected to the at least first exterior view camera 12a-12j, the at least first interior camera 22a, 22b and the at least first display 30. The processing circuitry 102 is configured to cause the vehicle camera control system 100 to obtain, by the least a first interior view camera 22a, 22b, at least a first interior view iv1, iv2 of the face and/or the head of the vehicle occupant 5 and determine, based on the at least first interior view iv1, iv2, at least any of a gaze direction gd and a head direction hd of the vehicle occupant 5 for understanding where the vehicle occupant is looking. According to an aspect the position of the at least first interior camera 22a, 22b in relation to the vehicle is used for determining a relative gaze direction gd and a head direction hd of the vehicle occupant 5 in relation to the vehicle. According to an aspect, the at least first interior camera 22a, 22b is mounted in a certain direction towards the vehicle occupant 5 and coordinates of the position of the face and/or eyes of the vehicle occupant 5 is compared with coordinates of the position of the at least first interior camera 22a, 22b. According to an aspect the at least first interior view camera 22a, 22b is configured to detect at least one of the face and the eyes of the vehicle occupant 5 for determining the gaze direction gd and/or head direction hd of the vehicle occupant 5.

Figure 2A:
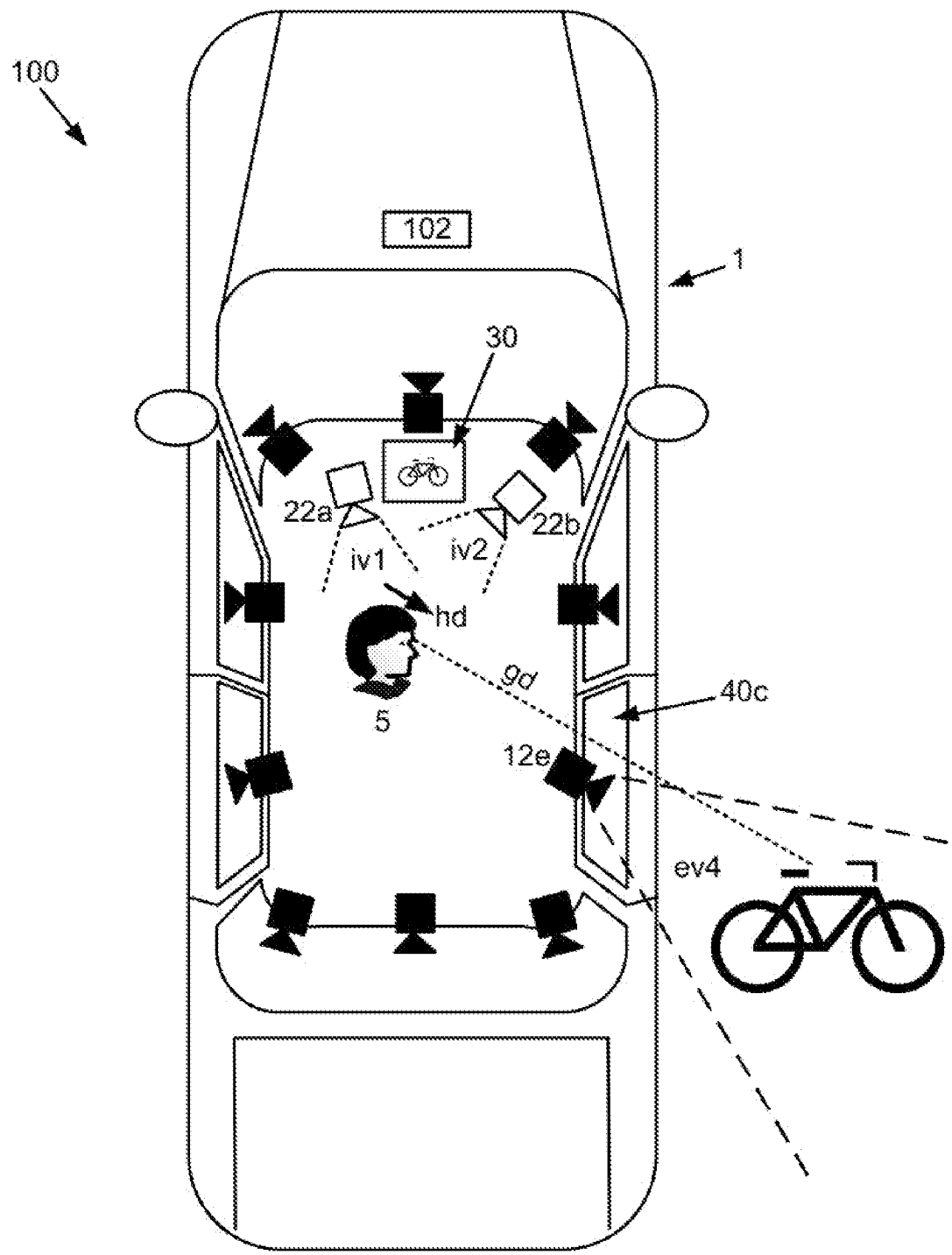
FIG. 2A illustrates an example when the view of interest for the vehicle occupant corresponds to a view through at least a first window according to an aspect of the disclosure.

FIG. 2A illustrates an example gaze direction gd, illustrated in the FIG. 2A with a dotted line from the eyes of the vehicle occupant through the right side rear window 40c to a bike that is located in the surroundings outside of the vehicle 1. FIG. 2A also illustrates an example head direction hd of the vehicle occupant 5, illustrated in the FIG. 2A with an arrow above the head of the vehicle occupant 5. According to an aspect the head direction hd is correlated with the gaze direction gd. According to an aspect the head direction hd gives an indication of the gaze direction of the vehicle occupant 5. In an example, if a small number of exterior view cameras 12a-12j are used, a head direction hd may be sufficient for understanding where the vehicle occupant is looking. In an example, if a large number of exterior view cameras 12a-12j are used, a gaze direction gd may be desired for understanding where the vehicle occupant is looking.

The processing circuitry 102 is further configured to cause the vehicle camera control system 100 to determine, based on at least any of the determined gaze direction gd and the determined head direction hd, a view of interest for the vehicle occupant 5. In the example illustrated in FIG. 2A, the gaze direction is towards the bike that is located in the surroundings outside of the vehicle 1. The processing circuitry 102 is further configured to determine, that the view of interest for the vehicle occupant is, at least partly, within the at least first exterior view ev1-ev10 of the at least first exterior view camera 12a-12j. In other words, in the example in FIG. 2A the view of interest, the bike, is within the exterior view ev4 of the at least first exterior view camera 12e. The processing circuitry 102 is further configured to display the at least first exterior view ev1-ev10 to the vehicle occupant 5 via the at least first display 30. In the example as illustrated in FIG. 2A, the exterior view ev4 of the bike is displayed to the vehicle occupant 5 via the at least first display 30. This aspect has the advantage that the at least first exterior view camera 12e can provide with more details of the exterior view ev4 than what the vehicle occupant 5 can see through the window 40c. An advantage with the vehicle camera control system 100 is hence that the view of interest is automatically displayed to the vehicle occupant at the at least first display 30, using the determined gaze direction gd and/or the determined head direction hd, which means that the vehicle occupant can maintain full attention to the surroundings around the vehicle 1.

According to an aspect it is determined that the view of interest for the vehicle occupant 5 corresponds to the view through at least a first window 40a, 40b, 40c, 40d of the vehicle 1. This means that when the vehicle occupant has a gaze direction gd and/or head direction hd that corresponds to the view through at least a first window 40a, 40b, 40c, 40d, at least a first exterior view ev1-ev10 that corresponds to a view through at least a first window 40a, 40b, 40c, 40d is provided to the vehicle occupant 5 via the at least first display 30. This means that the vehicle occupant 5 is interested in a view in a certain direction of the surroundings around the vehicle 1. According to an aspect it is determined that the view of interest for the vehicle occupant 5 corresponds to the view that is a blind spot for the vehicle occupant 5. In an example it is determined that the vehicle occupant is interested in a view in a certain direction of the surroundings around the vehicle 1 that is blocked by e.g. a pillar of the vehicle. In the example the vehicle occupant 5 may see part of the view through windows beside of the pillar. However the view of interest can still be determined to be the view in the direction where the pillar is in order to display the at least first exterior view ev1-ev10 to the vehicle occupant 5 in that direction behind the pillar. The same applies to e.g. when something is in the way of sight, e.g. a passenger, extra load, when the vehicle occupant 5 is looking in a certain direction.

According to an aspect it is determined that the view of interest for the vehicle occupant 5 corresponds to a mirror view mv of at least a first mirror 50a, 50b of the vehicle 1. In other words, this means that when the vehicle occupant has a gaze direction gd and/or head direction hd towards the at least first mirror 50a, 50b, at least a first exterior view ev1-ev10 that corresponds to the view as normally seen via the at least first mirror 50a, 50b is provided to the vehicle occupant 5 via the at least first display 30. According to an aspect the at least first mirror 50a, 50b is a side view mirror of the vehicle. According to an aspect the at least first mirror is a rear view mirror of the vehicle.

Figure 2B:
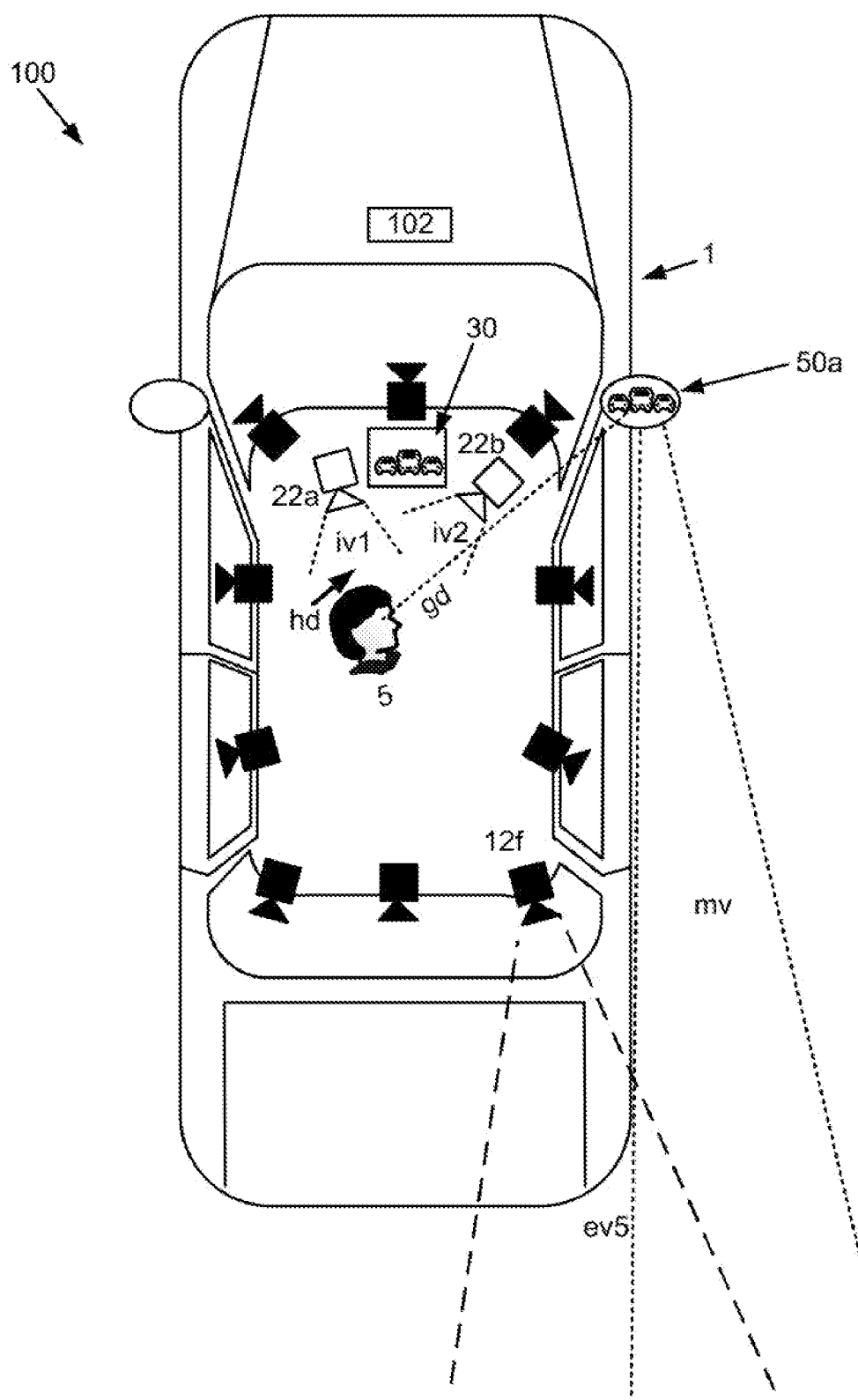
FIG. 2B illustrates an example when the view of interest for the vehicle occupant corresponds to a mirror view according to an aspect of the disclosure.

FIG. 2B illustrates an example when it is determined that the view of interest for the vehicle occupant 5 corresponds to a mirror view mv of at least a first mirror 50a of the vehicle 1. According to an aspect the when determining the gaze direction gd and/or head direction hd towards the at least first mirror 50a, 50b, the view of interest for the vehicle occupant 5 is the area of the mirror of the at least first mirror 50a, 50b. According to an aspect the position of the eyes of the vehicle occupant 5 in relation to the vehicle 1 is determined by the at least first interior camera 22a, 22b. According to an aspect the position of the eyes of the vehicle occupant 5 in relation to the vehicle 1 is used for determining the at least first exterior view ev1-ev10 that corresponds to the view as normally seen via the at least first mirror 50a, 50b. In the example as illustrated in FIG. 2B, the view as normally seen via the at least first mirror 50a is correlated with the exterior view ev5 of the exterior view camera 12f at the rear right of the vehicle 1. In the example in FIG. 2B the view is the traffic behind the vehicle 1. The exterior view ev5, in this example of the traffic, is provided to the vehicle occupant 5 via the at least first display 30.

According to an aspect the view of interest for the vehicle occupant 5 is further determined based on that the vehicle occupant 5 maintains a certain gaze direction gd or a head direction hd during at least a predetermined first time period t1. This means that the vehicle occupant has to show interest in the particular view of interest during a certain time period in order to change the view of the at least first display 30. This helps the vehicle occupant to see the desired view of interest.

In an example it may be desired not to change the view of the at least first display 30 unless the vehicle occupant 5 has shown interest in the particular view at least a predetermined first time period t1. In an example the predetermined first time period t1 is 2 seconds. According to an aspect the predetermined first time period t1 can be set by the vehicle occupant in order to provide a desired user experience of the vehicle camera control system 100. For example if the vehicle occupant 5 knows that the view of interest is determined based on that the vehicle occupant 5 maintains a certain gaze direction gd or a head direction hd during at least a predetermined first time period t1, the vehicle occupant may intentionally stay focused with the head and/or gaze the predetermined first time period t1, e.g. 3 seconds. In an example the view of the at least first display 30 remains the view of the last determined view of interest until a new view of interest is determined.

According to an aspect it is determined that the view of interest for the vehicle occupant 5 corresponds to a plurality of views in a plurality of directions around the vehicle 1, and displaying a plurality of exterior views ev1-ev10 to the vehicle occupant 5 via the at least first display 30. An advantage with this aspect is that the vehicle occupant 5 may have plural views of interest and that plural exterior views ev1-ev10 that corresponds to the plural views of interest is provided to the vehicle occupant 5 via the at least first display 30. In an example the vehicle occupant 5 is interested in the views along the right side of the vehicle e.g. when turning right at the red lights. In the example, the view of interest is determined to be a plurality of views along the right side of the vehicle 1 corresponding to the exterior views ev2-ev4 as illustrated in FIG. 2B. The plural views are then provided to the vehicle occupant 5 via the at least first display 30. According to an aspect when determining that the view of interest for the vehicle occupant 5 corresponds to a plurality of views in a plurality of directions around the vehicle 1, each view of interest is determined based on that the vehicle occupant 5 maintains a certain gaze direction gd or a head direction hd during at least a predetermined first time period t1 in each of the plurality of views. According to an aspect a number of determined views of interest are provided to the vehicle occupant 5 via the at least first display 30. According to an aspect a number of last determined views of interest are provided to the vehicle occupant 5 via the at least first display 30. In an example the last three determined views of interest are provided to the vehicle occupant 5 via the at least first display 30. In a further example, when a new view of interest is determined, the oldest determined view of interest is replaced so that the last three determined views of interest are provided to the vehicle occupant 5 via the at least first display 30.

According to an aspect the plurality of exterior views ev1-ev10 corresponds to a 360 degree view around the vehicle 1. This means that plural exterior views ev1-ev10 that corresponds to a 360 degree view of interest is provided to the vehicle occupant 5 via the at least first display 30. This helps the vehicle occupant to see the desired views of interest. In an example, when the vehicle occupant 5 is parking the vehicle 1 between two other vehicles, the vehicle occupant looks in a plurality of directions, and the vehicle camera control system 100 determines a plurality of views of interest. According to an aspect the view of interest for the vehicle occupant 5 is further determined based on that the vehicle occupant 5 change the gaze direction or the head direction a plurality of times within a predetermined second time period t2. In other words, if the vehicle occupant shows an interest in a plurality of different views within a predetermined second time period t2, the view of interest is determined based in the plurality of different gaze and/or head directions. In an example the predetermined second time period t2 is 2 seconds, and if a plurality of views of interest are determined during the predetermined second time period t2 the view of interest is determined based in the plurality of different gaze and/or head directions during the second time period t2. According to an aspect it can only be determined that the plurality of exterior views ev1-ev10 corresponds to a 360 degree view around the vehicle 1 when the reverse gear of the vehicle 1 is selected.

According to an aspect, the vehicle camera control system 100 can be configured so that a certain view of interest may not cause the vehicle camera control system 100 to display the at least first exterior view ev1-ev10 corresponding to the certain view of interest to the vehicle occupant 5 via the at least first display 30. For example if the certain view of interest is determined to be the view through the front window, i.e. the windshield. According to an aspect, the certain view, or the certain views, to be excluded can be set by the vehicle occupant in order to provide a desired user experience of the vehicle camera control system 100. In an example the vehicle occupant may desire that no views through the front side windows or the front window is taken into account when determining the view of interest for changing the view of the at least first display 30.

The disclosure further proposes a method for providing a desired camera view of interest for a vehicle occupant 5. According to an aspect the described vehicle camera control system 100 is configured to carry out any or more of the aspects of the method.

Figure 3:
FIG. 3 illustrates a flow chart of the method steps according to some aspects of the disclosure.

The steps of the method is illustrated in FIG. 3. The method comprising the step of S1 obtaining, by the least a first interior view camera 22a, 22b, at least a first interior view iv1, iv2 of the face and/or the head of the vehicle occupant 5, the step of S2 determining, based on the at least first interior view iv1, iv2, at least any of a gaze direction and a head direction of the vehicle occupant 5 for understanding where the vehicle occupant is looking. The method further comprising the step of S3 determining, that the view of interest for the vehicle occupant is, at least partly, within the at least first exterior view ev1-ev10 of the at least first exterior view camera 12a-12j, and the step of S4 displaying the at least first exterior view ev1-ev10 to the vehicle occupant 5 via the at least first display 30. An advantage with the vehicle camera control system 100 is that the view of interest is automatically displayed to the vehicle occupant at the at least first display 30, using the determined gaze direction gd and/or the determined head direction hd, which means that the vehicle occupant can maintain full attention to the surroundings around the vehicle.

According to an aspect, it is determined that the view of interest for the vehicle occupant 5 corresponds to the view through at least a first window 40a, 40b, 40c, 40d of the vehicle 1. This means that when the vehicle occupant has a gaze direction gd and/or head direction hd that corresponds to the view through at least a first window 40a, 40b, 40c, 40d, at least a first exterior view ev1-ev10 that corresponds to a view through at least a first window 40a, 40b, 40c, 40d is provided to the vehicle occupant 5 via the at least first display 30.

According to an aspect it is determined that the view of interest for the vehicle occupant 5 corresponds to a mirror view my of at least a first mirror 50a, 50b, 50c of the vehicle 1. In other words, this means that when the vehicle occupant has a gaze direction gd and/or head direction hd towards the at least first mirror 50a, 50b, at least a first exterior view ev1-ev10 that corresponds to the view as normally seen via the at least first mirror 50a, 50b is provided to the vehicle occupant 5 via the at least first display 30.

According to an aspect the view of interest for the vehicle occupant 5 is further determined based on that the vehicle occupant 5 maintains a certain gaze direction gd or a head direction hd during at least a predetermined first time period t1. In other words, this means that when the vehicle occupant has a gaze direction gd and/or head direction hd towards the at least first mirror 50a, 50b, at least a first exterior view ev1-ev10 that corresponds to the view as normally seen via the at least first mirror 50a, 50b is provided to the vehicle occupant 5 via the at least first display 30.

According to an aspect it is determined that the view of interest for the vehicle occupant 5 corresponds to a plurality of views in a plurality of directions around the vehicle 1, and displaying a plurality of exterior views ev1-ev10 to the vehicle occupant 5 via the at least first display 30. An advantage with this aspect is that the vehicle occupant 5 may have plural views of interest and that plural exterior views ev1-ev10 that corresponds to the plural views of interest is provided to the vehicle occupant 5 via the at least first display 30.

According to an aspect the plurality of exterior views ev1-ev10 corresponds to a 360 degree view around the vehicle 1. This means that plural exterior views ev1-ev10 that corresponds to a 360 degree view of interest is provided to the vehicle occupant 5 via the at least first display 30.

According to an aspect the view of interest for the vehicle occupant 5 is further determined based on that the vehicle occupant 5 change the gaze direction gd or the head direction hd a plurality of times within a predetermined second time period t2. In other words, if the vehicle occupant shows an interest in a plurality of different views within a predetermined second time period t2, the view of interest is determined based in the plurality of different gaze and/or head directions.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

Figure 4:
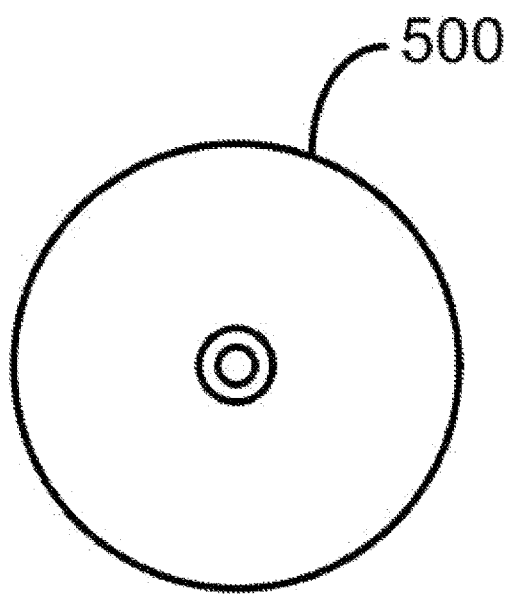
FIG. 4 illustrates a computer program product according to some aspects of the disclosure.

The disclosure further proposes, as illustrated in FIG. 4, a computer program product 500 comprising a non-transitory computer readable medium, having thereon a computer program comprising program instructions, the computer program being loadable into a processing circuitry 102 and configured to cause execution of the method when the computer program is run by the at least one processing circuitry 102.

According to an aspect the vehicle camera control system 100 is configured to carry out any or more of the aspects of the described method. According to an aspect of the disclosure, the method is carried out by instructions in a software program that is downloaded and run in the vehicle camera control system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A vehicle camera control system for providing a desired camera view of interest for a vehicle occupant for assisting maneuvering a vehicle, the vehicle camera control system comprises:
   a plurality of exterior view cameras configured to obtain a plurality of exterior views of the surroundings around the vehicle;
   at least a first interior view camera configured to obtain a first interior view of a face and/or a head of the vehicle occupant inside of the vehicle;
   at least a first display configured to display a first exterior view based on the obtained plurality of exterior views; and
   a processing circuitry operatively connected to the plurality of exterior view cameras, the at least first interior camera and the at least first display, configured to cause the vehicle camera control system to:
      obtain, by the least a first interior view camera, the first interior view of the face and/or the head of the vehicle occupant;
      determine, based on the first interior view, at least any of a gaze direction and a head direction of the vehicle occupant for understanding where the vehicle occupant is looking;
      determine, based on at least any of the determined gaze direction and the determined head direction, a view of interest for the vehicle occupant, wherein the view of interest is further determined based on detecting that the vehicle occupant changes the gaze direction or the head direction a plurality of times within a predetermined time period; and
      create a 360 degree view of the surroundings around the vehicle using the plurality of exterior views, select the 360 degree view as the view of interest in response to determining that the vehicle occupant changes the gaze direction or the head direction a plurality of times within a predetermined time period, and display, via the at least first display, the 360 degree view of the surroundings around the vehicle.

2. The vehicle camera control system according to claim 1, wherein it is determined that the view of interest for the vehicle occupant corresponds to a window view through a first window of the vehicle.

3. The vehicle camera control system according to claim 1, wherein it is determined that the view of interest for the vehicle occupant corresponds a mirror view of at least a first mirror of the vehicle.

4. The vehicle camera control system according to claim 1, wherein the view of interest for the vehicle occupant is further determined based on that the vehicle occupant maintains a certain gaze direction or a head direction during at least a predetermined second time period.

5. The vehicle camera control system according to claim 1, wherein the processing circuitry is further configured to:
determine, based on at least any of the determined gaze direction and the determined head direction, a second view of interest for the vehicle occupant, wherein the second view of interest corresponds to a second exterior view of the plurality of exterior views;
determine, that the second view of interest for the vehicle occupant is, at least partly, within a second exterior view of a second exterior view camera; and display the second exterior view via the at least first display, the second exterior view corresponds to a second portion of the 360 degree view around the vehicle.

6. The vehicle camera control system according to claim 1, wherein the processing circuitry is further configured so that a certain view of interest does not cause the vehicle camera control system to display, via the at least one display, the first exterior view corresponding to the certain view of interest.

7. The vehicle camera control system according to claim 6, wherein the certain view of interest is through the front side windows or the front window of the vehicle.

8. The vehicle camera control system according to claim 1, further comprising a plurality of exterior view cameras configured to obtain a plurality of exterior views corresponding to a 360 degree view of the surroundings outside of around the vehicle, the processing circuitry further configured to:
determine, that the view of interest for the vehicle occupant is, at least partly, within the an exterior view of at least one of the plurality of exterior view cameras; and
display the exterior view via the at least first display, the exterior view corresponds to a portion of the 360 degree view around the vehicle to the vehicle occupant via the at least first display.

9. A method for providing a desired camera view of interest for a vehicle occupant for assisting maneuvering a vehicle, the method comprising:
obtaining, by at least a first interior view camera, a first interior view of a face and/or a head of the vehicle occupant;
obtaining, by a plurality of exterior view cameras, a plurality of exterior views of the surrounding around the vehicle;
determining, based on the first interior view, at least any of a gaze direction and a head direction of the vehicle occupant for understanding where the vehicle occupant is looking;
determining, based on at least any of the determined gaze direction and the determined head direction, a view of interest for the vehicle occupant, wherein the view of interest is further determined based on detecting that the vehicle occupant changes the gaze direction or the head direction a plurality of times within a predetermined time period;
creating a 360 degree view of the surroundings around the vehicle using the plurality of exterior views, selecting the 360 degree view as the view of interest in response to determining that the vehicle occupant changes the gaze direction or the head direction a plurality of times within a predetermined time period; and
displaying, via the at least first display, the 360 degree view of the surroundings around the vehicle.

10. The method according to claim 9, wherein it is determined that the view of interest for the vehicle occupant corresponds to a window view through a first window of the vehicle.

11. The method according to claim 9, wherein it is determined that the view of interest for the vehicle occupant corresponds a mirror view of at least a first mirror of the vehicle.

12. The method according to claim 9, wherein the view of interest for the vehicle occupant is further determined based on that the vehicle occupant maintains a certain gaze direction or a head direction during at least a predetermined second time period.

13. The method according to claim 9, further comprising:
determining, based on at least any of the determined gaze direction and the determined head direction, a second view of interest for the vehicle occupant, wherein the second view of interest corresponds to a second exterior view of the plurality of exterior views;
determining, that the second view of interest for the vehicle occupant is, at least partly, within a second exterior view of a second exterior view camera; and display the second exterior view via the at least first display, the second exterior view corresponds to a second portion of the 360 degree view around the vehicle.

14. The method according to claim 9, wherein a certain view of interest does not cause the vehicle camera control system to display, via the at least one display, the first exterior view corresponding to the certain view of interest.

15. The method according to claim 14, wherein the certain view of interest is through the front side windows or the front window of the vehicle.

16. A computer program product comprising a non-transitory computer readable medium, having thereon a computer program comprising program instructions, the computer program being loadable into a processing circuitry and configured to cause execution of the method according to claim 9 when the computer program is run by the at least one processing circuitry.

* * * * *